(12) United States Patent
Siegel

(10) Patent No.: US 11,851,143 B2
(45) Date of Patent: Dec. 26, 2023

(54) MOORING STRUCTURE FOR OCEAN WAVE ENERGY CONVERTERS

(71) Applicant: Atargis Energy Corporation, Pueblo, CO (US)

(72) Inventor: Stefan G. Siegel, Pueblo, CO (US)

(73) Assignee: Atargis Energy Corporation, Pueblo, CO (US)

( * ) Notice: Subject to any disclaimer, the term of this patent is extended or adjusted under 35 U.S.C. 154(b) by 130 days.

(21) Appl. No.: 17/149,388

(22) Filed: Jan. 14, 2021

(65) Prior Publication Data

US 2022/0219791 A1    Jul. 14, 2022

(51) Int. Cl.
B63B 21/50 (2006.01)
B63B 35/44 (2006.01)
F03B 13/20 (2006.01)

(52) U.S. Cl.
CPC ............ B63B 35/44 (2013.01); B63B 21/502 (2013.01); F03B 13/20 (2013.01); B63B 2035/4466 (2013.01); F05B 2240/97 (2013.01)

(58) Field of Classification Search
CPC ........ B63B 35/44; E02B 9/08; F05B 2240/97; F03B 13/20; F03D 13/25
USPC .................................. 405/76, 203, 204, 208
See application file for complete search history.

(56) References Cited

U.S. PATENT DOCUMENTS

| | | | | |
|---|---|---|---|---|
| 3,826,099 A | * | 7/1974 | Lovie | .................... E02B 17/021 405/196 |
| 3,927,535 A | * | 12/1975 | Giblon | .................. E02B 17/021 405/203 |
| 7,686,543 B2 | * | 3/2010 | They | ....................... E01D 19/02 405/224.1 |
| 7,686,583 B2 | | 3/2010 | Siegel | |
| 7,762,776 B2 | | 7/2010 | Siegel | |
| 8,100,650 B2 | | 1/2012 | Siegel | |
| 8,277,146 B2 | * | 10/2012 | Espedal | ................ F03B 13/182 405/75 |
| 8,937,395 B2 | | 1/2015 | Siegel | |
| 9,115,687 B2 | | 8/2015 | Siegel | |
| 9,297,351 B2 | | 3/2016 | Siegel | |
| 2009/0194664 A1 | * | 8/2009 | Evans | ..................... G01B 21/04 248/670 |
| 2014/0308080 A1 | * | 10/2014 | Younan | ............... E02B 17/0021 405/196 |
| 2015/0063910 A1 | * | 3/2015 | Meltsov | ................ F03B 13/262 114/230.14 |

OTHER PUBLICATIONS https://www.dictionary.com/browse/point.*

* cited by examiner

*Primary Examiner* — Sean D Andrish

(74) *Attorney, Agent, or Firm* — David T. Millers

(57) ABSTRACT

A mooring system for an Ocean Wave Energy Converters (OWEC) includes multiple structural members such as legs and braces that are linearly extendible and connected using mobile joints, each joint providing two degrees of freedom for rotations about the joint. Mobile joints also attach bottom ends of the legs to mooring points. A jacking system can change lengths of the extensible structural members to adjust depth of the OWEC for operation or for storm safety, to lift the OWEC out of the water for maintenance, or to align the OWEC to an incoming wave direction.

4 Claims, 8 Drawing Sheets

MOORING STRUCTURE FOR OCEAN WAVE ENERGY CONVERTERS

FEDERALLY SPONSORED RESEARCH OR DEVELOPMENT

This invention was made with government support under grant No. DE-EE0008626 awarded by the Department of Energy. The government has certain rights in the invention.

CROSS-REFERENCE TO RELATED APPLICATIONS

This patent document is related to co-filed U.S. patent application Ser. No. 17/149,272, entitled "Mooring Latch for Marine Structures," which is hereby incorporated by reference in its entirety.

BACKGROUND

A Wave Energy Converter (WEC) is a system for converting the energy from waves into other forms of energy. Particularly, WECs may be deployed in the ocean to produce electrical energy from ocean waves. WECs are a desirable energy source because WECs can produce electrical power without producing green house gases such as $CO_2$ (or any waste product) and can produce electrical energy when other "green" energy systems are dormant or inefficient. For example, WECs can efficiently produce power at night when solar energy systems are inoperable and produce power in low wind conditions where wind power is inefficient.

A Cyclic or Cycloidal Wave Energy Converter (CycWEC) is a type of WEC that uses hydrofoils that interact with incoming ocean waves to create lift that applies torque to rotate a shaft and drive a conventional electrical generator. The hydrofoils in a CycWEC are mounted on standoffs or other lever arm structures that connect the hydrofoils to the driven shaft and that cause the hydrofoils to move in a circle around the driven shaft and trace a cycloidal path relative to the traveling waves. U.S. Pat. No. 7,686,583, entitled "Cyclical wave energy converter" and U.S. Pat. No. 7,762,776, entitled "Vortex Shedding Cyclical Propeller," which are hereby incorporated by reference in their entirety, further describe examples of the structure and operation of CycWECs. CycWECs have been shown to provide high energy conversion efficiency when compared, for example, to WEC systems with floats that move up and down and use additional mechanical systems, e.g., a crankshaft system, to generate torque to turn a generator.

Any Ocean Wave Energy Converter (OWEC) that extracts power from incoming ocean waves experiences reactive forces as a result of the power extraction according to Newton's laws of motion. A mooring system may apply a counteracting force to the OWEC to maintain the OWEC's position for operation. Due to the rotating particle motions in wave-induced flow fields, the active forces on an OWEC may orient in any direction relative to the wave crest, which makes traditional mooring lines inadequate for OWECs since traditional mooring lines only transfer loads in one direction (that of the line) and only in tension. A mooring system for an OWEC generally needs to be able to survive variable ocean conditions and continue to position the OWEC for efficient wave energy conversion. A mooring system for a CycWEC may, for example, need to position the CycWEC at a desired ocean depth that may be optimized depending on wave amplitude and may need to regularly reorient the CycWEC depending on the direction of wave propagation. Further, mooring systems ideally should be cost effective to manufacture, install, operate, and maintain.

SUMMARY

In accordance with an aspect of the invention, a rigid mooring system attaches an Ocean Wave Energy Converter (OWEC) to the ocean floor using multiple extendible members, e.g., extendible legs and braces, that can be actively controlled for installation, operation, maintenance, and decommissioning of the OWEC. In particular, changes in the lengths of the extendible members can maneuver, position, and orient, e.g., adjust height, yaw, and roll of, an OWEC to support operation of a variety of types of OWEC in a variety of ocean conditions. The extensible system may further facilitate installation of the mooring system and OWEC, may lift the OWEC out of the water or to depth suitable for maintenance, or submerge the OWEC to an ocean depth that protects the OWEC (and the mooring system) from damage by storms or other surface conditions or events.

Some examples of the present disclosure are particularly useful for OWECs that have a large aspect ratio, e.g., OWECs commonly referred to in the industry as wave attenuators or wave terminators, because the mooring system can adjust the orientation of an OWEC relative to changing wave patterns. For wave energy converters that need to be aligned to an incoming wave direction, a mooring system according to an example of the present disclosure allows for adjusting the orientation of the OWEC.

Some examples of the mooring system can fully support a range of activities encountered during the life cycle of a wave energy converter, from commissioning to operation, storm survival and maintenance throughout the operational life of a converter, and all the way to the decommissioning of the system. Examples of the mooring systems disclosed herein do not require external stabilized platforms, dynamic positioning vessels, heavy lifting equipment, divers, or Remotely Operated Vehicles (ROVs) for installation, operation, or maintenance. The mooring systems can provide a stabilized platform with adjustment of the wave energy converter's submergence as well as orientation relative to incoming waves. For maintenance, the mooring system in some examples of the invention can lift the platform entirely out of the water to allow access to all components of the system that may require scheduled or unscheduled maintenance.

BRIEF DESCRIPTION OF THE DRAWINGS

FIG. 2 shows a jacking or actuation system that may be incorporated in an extensible member such as a leg or brace in accordance with an example of the present disclosure.

FIG. 3 shows a mooring platform in accordance with an example of the present disclosure including joints such as Cardan connection points for extendible members and mooring connectors.

FIG. 4-1 shows an example of a CycWEC with a mooring platform in a stowed leg configuration.

FIG. 4-2 shows a CycWEC with a mooring platform having three legs unfolded and one leg in the stowed position.

FIG. 4-3 shows a CycWEC with a mooring platform with one leg unmoored and lifted to the surface for maintenance.

FIGS. 5-1 show a CycWEC with a mooring platform in a yawed position.

FIG. 5-2 shows a CycWEC with a mooring platform with legs fully closed for a protected or survival position.

FIG. 5-3 shows a CycWEC with a mooring platform with legs fully extended for a maintenance position.

The drawings illustrate examples for the purpose of explanation and are not of the invention itself. Use of the same reference symbols in different figures indicates similar or identical items.

DETAILED DESCRIPTION

Figure 1:
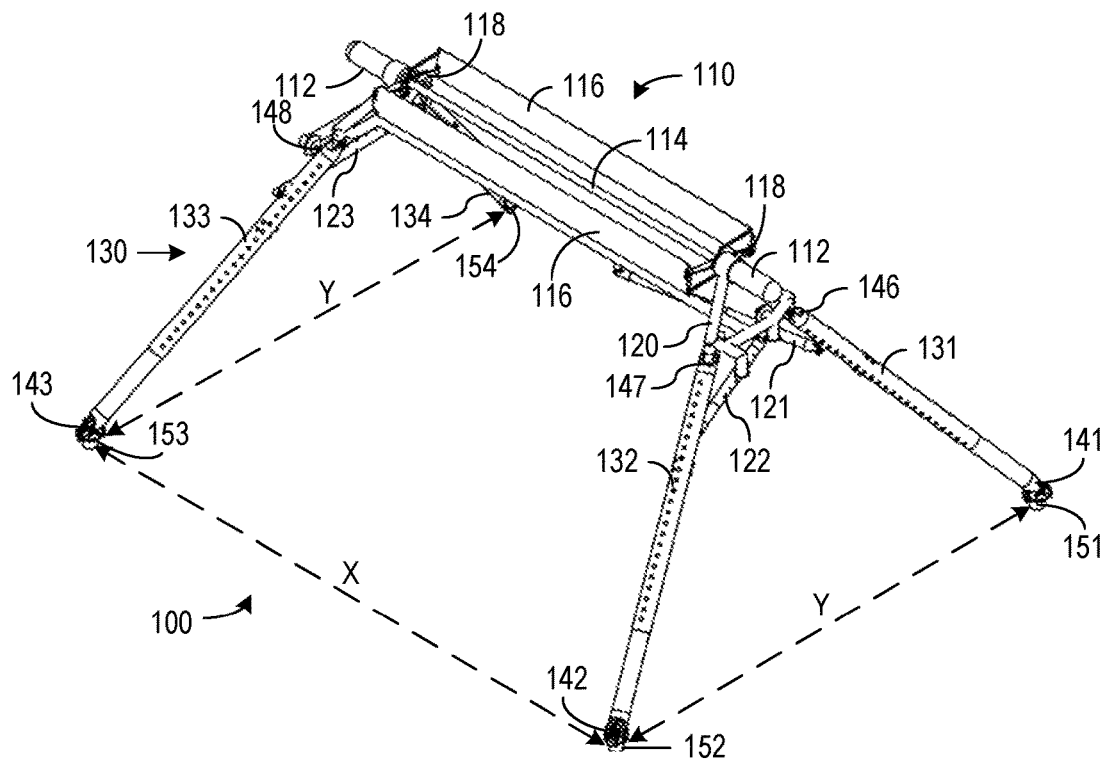
FIGS. 1-1, 1-2, 1-3, and 1-4 respectively show perspective, top, front, and end views of a Cycloidal Wave Energy Converter (CycWEC) with a four-legged mooring system in an operational configuration.

A mooring system for an ocean wave energy converter (OWEC) transfers loads from the OWEC structure through a platform with at least three extensible legs attached to mooring points that attach to the ocean floor. Each leg and other extensible, structural members in the mooring system may have a jacking or actuation system to extend or shorten the member. Joints attach the legs to the platform and mooring points and provide two degrees of freedom for rotations about where the leg attaches to the platform or to a mooring point. Neither three nor four legs with such joints are sufficient to restrict all six degrees of freedom, e.g., three degrees of freedom in translation in X, Y, and Z directions and three degrees of freedom in rotation in XY, YZ and ZX planes, of the platform, so additional extensible braces or legs (also having attachment joints providing two degrees of rotational freedom) may be added to stabilize the platform. The platform with a sufficient number of legs and/or braces is stable/rigid when lengths of the legs or braces are fixed, but the mooring system permits changes to the pose or configuration of the platform through adjustments or changes of the lengths of one or more of the legs or braces.

FIGS. 1-1, 1-2, 1-3, and 1-4 respectively show a perspective view, a top view, a front view, and a side view of an OWEC system 100 in accordance with an example of the present disclosure. In the illustrated example, OWEC system 100 includes a OWEC 110 that is on or forms part of a platform 120 of a mooring system 130 having eight structural members, four legs 131, 132, 133, and 134 and four braces 121, 122, 123, and 124 that are extensible. Structural members 131, 132, 133, 134, 121, 122, 123, and 124 are extensible in the sense that their lengths may be changed, e.g., extended or contracted, while the configuration of mooring system 130 is being changed, but the lengths of structural members 131, 132, 133, 134, 121, 122, 123, and 124 may be rigidly fixed while the configuration of mooring system 130 is being maintained. Structural members 131, 132, 133, and 134 and 121, 122, 123, and 124 are sometimes distinguished herein as being legs or braces depending on whether the structural member has an end that attaches to an external structure, e.g., to a mooring point anchored to the ocean floor, or attaches internally to other elements of mooring system 130. While FIGS. 1-1, 1-2, 1-3, and 1-4 show the example of OWEC 110 being a CycWEC, more generally, other types of OWEC may be similarly moored.

CycWEC 110 as shown in FIG. 1-1 includes one or more electrical generators 112 that may be mounted on platform 120. Each generator 112 may be any type of electrical generator, e.g., a dynamo or an alternator, that makes use of electromagnetic induction or other processes to transform mechanical rotation into direct or alternating electrical current. A shaft 114 of CycWEC 110 is coupled to generators 112, e.g., directly or through a transmission, so that rotation of shaft 114 causes generators 112 to generate electrical energy. In the illustrated configuration, shaft 114 extends between two generators 112 mounted on platform 120 and is free to rotate relative to platform 120. One or more hydrofoils 116 attaches to shaft 114 through respective pairs of spoke or standoff mechanisms 118 near the ends of hydrofoils 116 and shaft 114, and in the example of FIG. 1-1, CycWEC 110 includes two hydrofoils 116 positioned 180° apart relative to rotation of shaft 114. In operation, a wave passing through CycWEC 110 in a direction other than parallel to the lengths of hydrofoils 116 (and for best efficiency in a direction perpendicular to the lengths of hydrofoils 116) interacts with hydrofoils 116 causing lift. The wave-induced lift and the moment arm of standoff mechanisms 118 create torque to turn shaft 114, causing generators 112 to produce electrical energy. For efficient production of lift and the resulting torque, a control system (not shown) for CycWEC 110 may operate standoff mechanisms 118 to control the attack angles of hydrofoils 116 as hydrofoils 116 rotate and each wave passes. In particular, the attack angle may vary according to a pitching schedule that depends on the amplitude, frequency, and phase of the interacting waves and/or the rotational angle of the hydrofoil 116 about shaft 114. See U.S. Pat. No. 7,762,776, entitled "Vortex Shedding Cyclical Propeller," which describes example uses of pitching schedules.

Mooring system 130 uses joints 141, 142, 143, and 144, e.g., universal or Cardan joints, to attach the bottoms of legs 131, 132, 133, and 134 to mooring points 151, 152, 153, and 154 and similar joints 146, 147, 148, and 149 to attached respective legs 131, 132, 133, and 134 to platform 120. Each joints 141, 142, 143, 144, 146, 147, 148, or 149 is rigid with regard to compression or tension but permits rotation of the attached leg 131, 132, 133, or 134 about two axes through the joint. Mooring points 151, 152, 153, and 154 may be fixed mounting structures directly anchored in or on the ocean floor or fixed on a platform (not shown) that extends to and anchors on the ocean floor. Each joint 146, 147, 148, or 149 connecting a leg 131, 132, 133, or 134 to platform 120 is such that no bending moments are transferred from the leg 131, 132, 133, or 134 to the platform 120, and each leg 131, 132, 133, or 134 is free to rotate around a horizontal and vertical axis freely while being firmly connected to platform 120 to transmit tension and compression loads between legs 131, 132, 133, and 134 and platform 120. A common joint mechanism to achieve this is a Cardan joint, universal joint, or U-joint, but other connections such as swivel ball joints may be used, as desired, to achieve this function.

The four extensible braces 121, 122, 123, and 124 connect between platform 120 and respective legs 131, 132, 133, and 134 using similar joints, e.g., U-joints or Cardan joints. For fixed lengths of extensible legs 131, 132, 133, and 134 and braces 121, 122, 123, and 124, legs 131, 132, 133, and 134 and braces 121, 122, 123, and 124 together restrict or constrain all six degrees of freedom of motion of platform 120 and mounted CycWEC 110, with redundancy of two degrees of freedom. A four-leg configuration with four braces is useful in order to maintain a fully constrained platform for a fail-safe feature in the event of partial failures or to remain fully constrained when unloading some of the legs or braces for maintenance. However, a three-leg configuration with three braces or equivalently a six-leg configuration with no braces could alternatively be employed for a fully constrained structure having fewer elements. Since OWEC 110 may create large loads, a particular advantage of mooring system 130 is that the legs and braces are all loaded in tension/compression only and not in bending which reduces structural costs substantially because smaller diameter structural members with thinner wall material can be used.

Legs 131, 132, 133, and 134 are not all horizontal or vertical and generally converge from the wider separations X and Y of mooring points 151, 152, 153, and 154 to the more closely space attachments of legs 131, 132, 133, and 134 to platform 120. In the configuration of FIGS. 1-1 to 1-4, mooring points 151, 152, 153, and 154 are at the corners of a horizontal rectangle, but more generally, mooring points 151, 152, 153, and 154 are not required to be coplanar or in a rectangular formation.

The lower end of each leg 131, 132, 133, and 134 may attach to mooring points 151, 152, 153, and 154 and the ocean floor in a semi-permanent fashion by means of a mooring latch. The function of a mooring latch is to independently attach and release each leg 131, 132, 133, or 134 to and from respective mooring point 151, 152, 153, or 154. A variety of latch systems may be used to attach the legs to the mooring points, and co-file U.S. Pat. App. entitled "Mooring Latch For Marine Structures," which is hereby incorporated by reference above, particularly describes a mooring latch suitable for connecting legs 131, 132, 133, and 134 to mooring points 151, 152, 153, and 154. Each mooring latch may incorporate or provide a free-to-rotate joint 141, 142, 143, or 144 but is fixed in tension and compression kinematics the same as the joint 146, 147, 148, or 149 at the other end of the leg 131, 132, 133, or 134. In addition to being connected at both ends, each leg 131, 132, 133, or 134, along its length, features a third connection point or joint to which the associated brace 121, 122, 123, or 124 attaches.

Legs 131, 132, 133, and 134 and braces 121, 122, 123, and 124 are independently adjustable in length. A jacking or actuation system of any type suitable for the offshore operation may be employed to adjust the length of each leg 131, 132, 133, or 134 or brace 121, 122, 123, or 124. For example, the jacking system may be internal or external to the legs 131, 132, 133, and 134 and braces 121, 122, 123, and 124 and may employ either a pin and hydraulic cylinder or a rack and pinion system that are known for use in jack-up platforms. The illustrated system 100 includes legs 131, 132, 133, or 134 and braces 121, 122, 123, and 124 having holes for a pin and hydraulic cylinder jacking system.

Figures 1, 2:
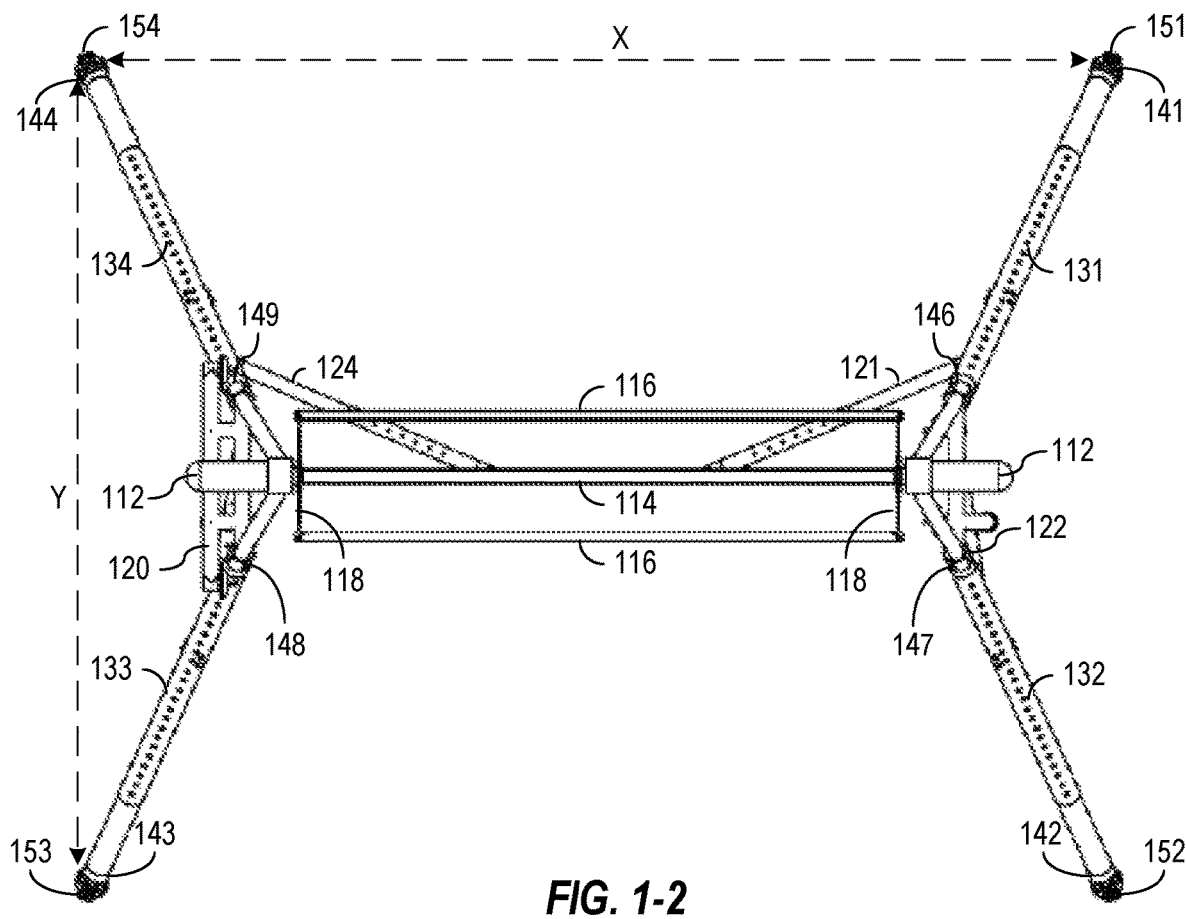

FIG. 2 illustrates a portion of an extensible, structural member including an example of a jacking or actuation system 200 that may be incorporated in any of the extensible structural members. A structural member may particularly include telescoping tubes 210 and 220, e.g., where tube 210 may slide into tube 220. Tube 210 includes one or more linear gears or racks 212 that engage a pinion or gear in a drive system 222 mounted on tube 220. Electrical motors 224 can be operated to turn or drive the pinions in drive systems 222 that engage racks 212 to pull tube 210 further into tube 220 and shorten the length of the extensible member or to push tube 210 further out of tube 220 to increase the length of the extensible member. Jacking system 200 and particularly drive system 222 may further include a brake to rigidly hold or maintain the length of the extensible member when a desired length has been reached or a clutch to allow tube 210 to freely slide relative to tube 220 while other jacking systems alter the length or lengths of other structural members. Jacking systems 200, when incorporated in each leg 131, 132, 133, and 134 and brace 121, 122, 123, and 124 may make the length of each leg and brace independently (or dependently) adjustable, which may be used to reconfigure mooring system 130 for various purposes during the installation, operation, maintenance, or decommissioning of OWEC system 100, as described further below.

The end view of FIG. 1-4 illustrates a configuration of OWEC system 100 that keeps platform 120 in a position where CycWEC 110 is fully submerged and at a suitable depth D below a surface level 160 of the ocean. Depth D may be selected, e.g., adjusted, based on the amplitude of incoming waves and the diameter of the circular path of hydrofoils 116 in CycWEC 110, so that CycWEC 110 can efficiently interact with surface waves 162 with no interference from platform 120 that might otherwise reduce the power that CycWEC 110 could extract from the wave. In general, a vertical distance Z of a CycWEC 110 relative to fixed mooring points 151 to 154 (or the ocean floor or other fixed location) depends on lengths of legs 131, 132, 133, and 134. In FIG. 1-4, simultaneously increasing or decreasing lengths of legs 131 and 132 increases or decreases vertical distance Z. A control system (described further below) may control jacking systems in mooring system 130 to actively alter the lengths of legs 131, 132, 133, and 134 and thereby change vertical distance Z to provide a desired depth D in changing ocean conditions, e.g., changing tides or wave amplitudes. As also described further below, the end of platform 120 shown in FIG. 1-4 may be shifted horizontally through control of changes in length of leg 131 relative to the length of leg 132. While changes in the lengths of legs 131 and 132 may also move the end of platform 120 opposite from the end illustrated in FIG. 1-4, the effect on the position of the opposite end of platform 120 may be negligible.

Figures 1, 2, 3:
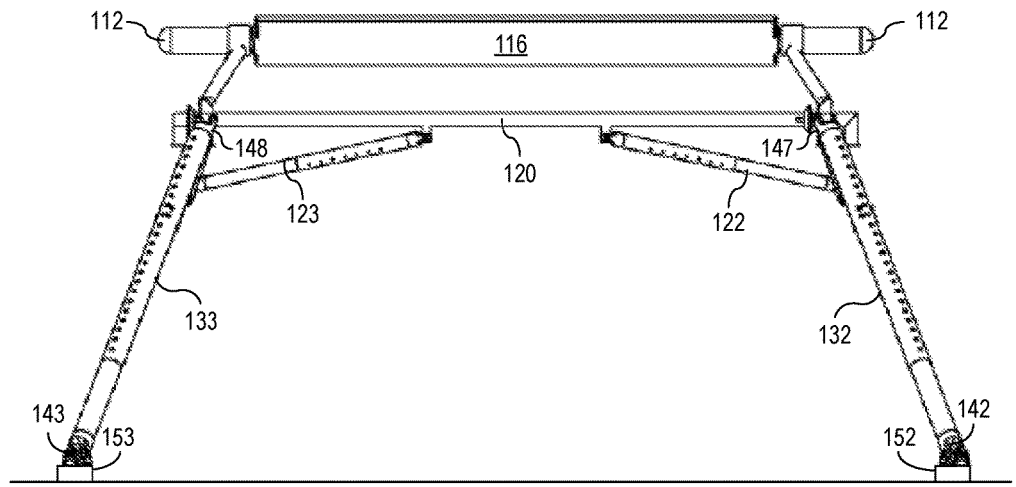

FIG. 3 shows an example configuration of platform 120 without legs 131, 132, 133, and 134 or braces 121, 122, 123, and 124 attached. Platform 120 may be constructed using welded rectangular or cylindrical tubular structures to form a truss or beam 314. OWEC mounting structures 312, brace attachment points 321, 322, 323, and 324, and leg attachment points 331, 332, 333, and 334 attach to or extend from truss or beam 314. Additional leg mounting points 341, 342, 343, and 344 on platform 120 provide temporary attachment points for the bottom ends of legs 131, 132, 133, and 134 when the mooring system is in a stowed configuration, which may be used for transportation of the OWEC system as described further below. Platform 120 also has "feet" 351, 352, 353, and 354 on which platform 120 can rest during assembly of the OWEC, legs, and braces on platform 120 before the OWEC system is moved into the ocean. Truss or beam 314 may be sized to extend the length of the OWEC to be mounted on platform 120, and OWEC mounting structures 312 extend generally upward from the ends of truss or beam 314 to a height that depends on lateral dimensions of the OWEC and the spacing needed to prevent platform 120 from interfering with wave energy conversion when the OWEC is at operational depths. Further dimensions of OWEC mounting structures 312 and beam 314 in a particular platform 120 may take any configuration needed to connect or mount a desired OWEC to the legs and braces and provide necessary stability to oppose expected reaction forces on the OWEC. For a CycWEC such as shown in FIG. 1-1 as an example, mounting structure 312 may extend to a height that accommodates the cycloidal movement of hydrofoils 116, e.g., about 10 m to 20 m high for a OWEC radius of 6 m, and beam 314 may have a length that accommodates the lengths of hydrofoils 116, e.g., about 70 m to 90 m for a hydrofoil with a span of about 60 m. The width of mounting structure 312 may be similar to the height of mounting structure 312 and must be sufficient to withstand expected reactive torques and forces on the OWEC and platform 120.

In the example of FIG. 3, attachment points 331, 332, 333, and 334 for legs 131, 132, 133, and 134 are symmetrically located at or near four corners of platform 120. The range of extension in the lengths of legs 131, 132, 133, and 134 in general depends on the water depth at the installation location of the mooring system. The maximum length of a leg 131, 132, 133, and 134 may be selected based on the requirement to lift the OWEC out of the water, and the minimum length of a leg 131, 132, 133, and 134 may be selected based on the desired depth needed for storm survival at the installation location.

Braces 121, 122, 123, and 124 attach to respective legs 131, 132, 133, and 134 at one end and attach to attachment points 321, 322, 323, and 324 on platform 120 with their other ends. The locations of brace attachment points 321, 322, 323, and 324 on platform 120 differ. Referring to FIG. 1-1 and FIG. 3, a pair of legs 132 and 133 have their braces 122 and 123 attached to attachment points 322 and 323 on the short sides or ends of platform 120. This orients braces 122 and 123 to the counteract shaft torque generated by the mounted OWEC. Braces 122 and 123 are sometimes referred to herein as torque braces 122 and 123 since braces 122 and 123 prevent rotation of the platform 120 around the wave energy converter shaft 114. Conversely, a pair of braces 121 and 124 prevents lateral swaying motion of platform 120 along the direction of shaft 114 and are sometimes referred to herein as lateral braces 121 and 124. Attachment points 321 and 324 of braces 121 and 124 to platform 120 are thus located along the long side, e.g., beam or truss 314, of platform 120 as shown in FIG. 3.

The joints of the mooring system allow reconfiguration of the mooring system throughout the life cycle of an OWEC. In particular, mooring systems as described herein may be reconfigured by changing the lengths (and, as a result of the length change, the connection angles) of the extensible structural members during different operating stages of an OWEC.

Figures 1, 2, 3, 4:
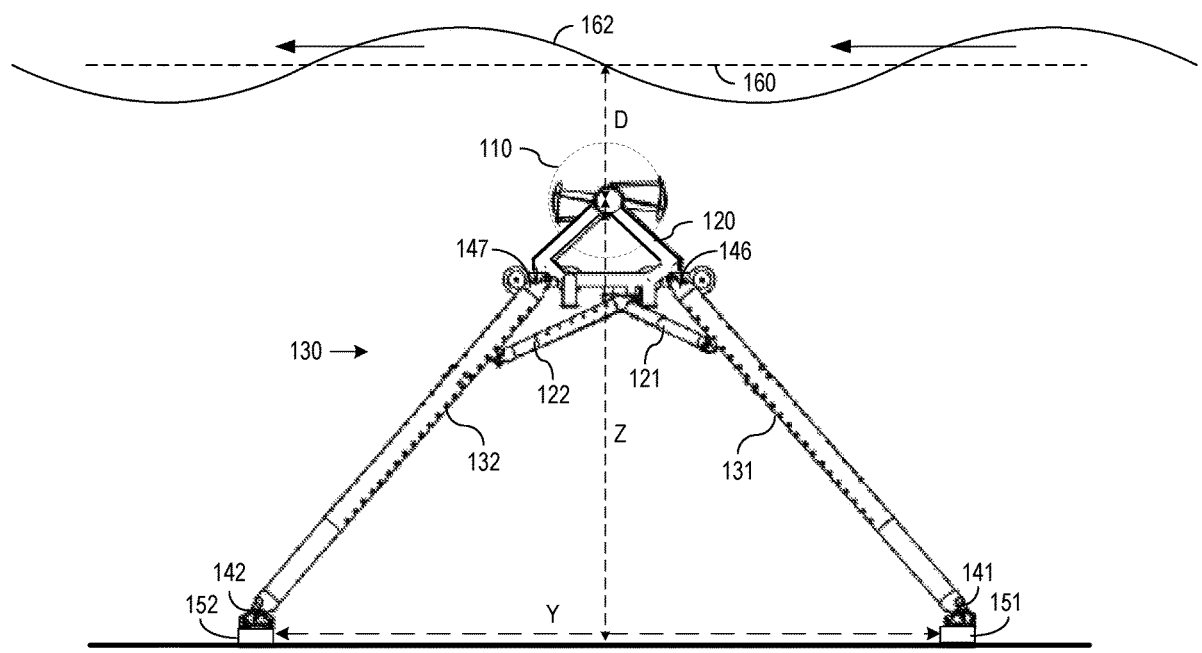
Figure 3:
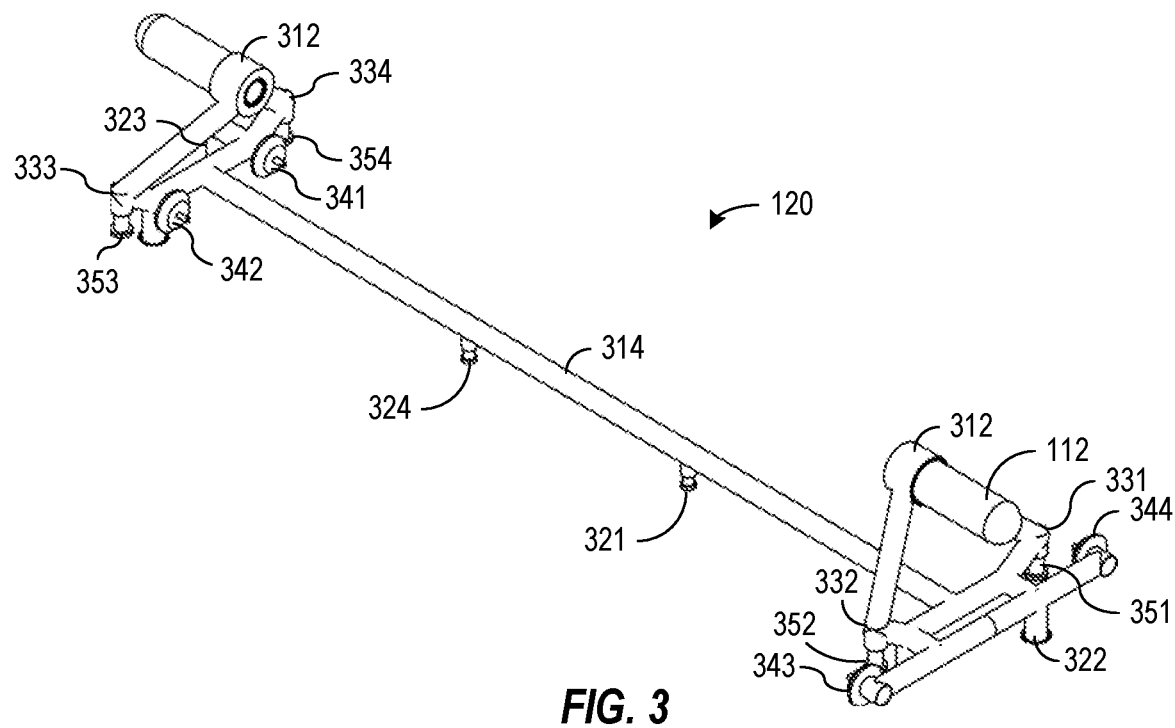
Figure 2:
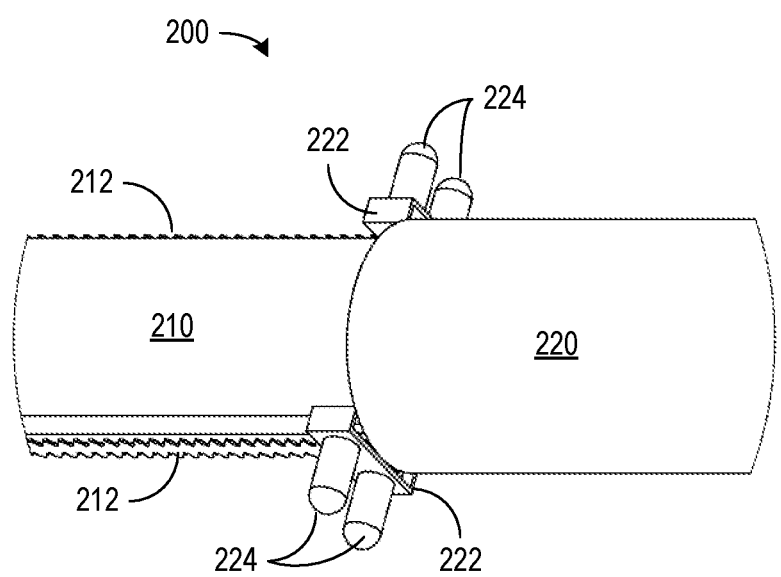
Figures 1, 4:
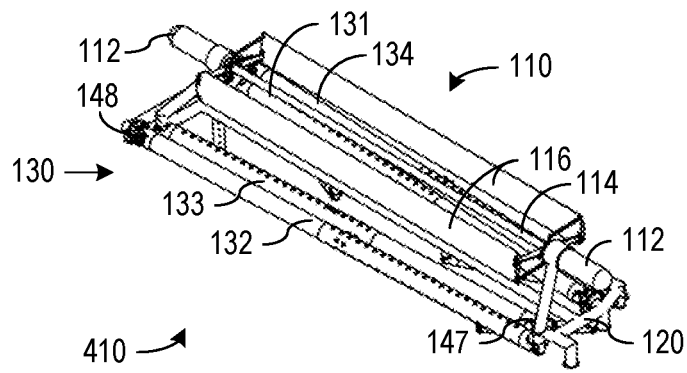
Figures 2, 4:
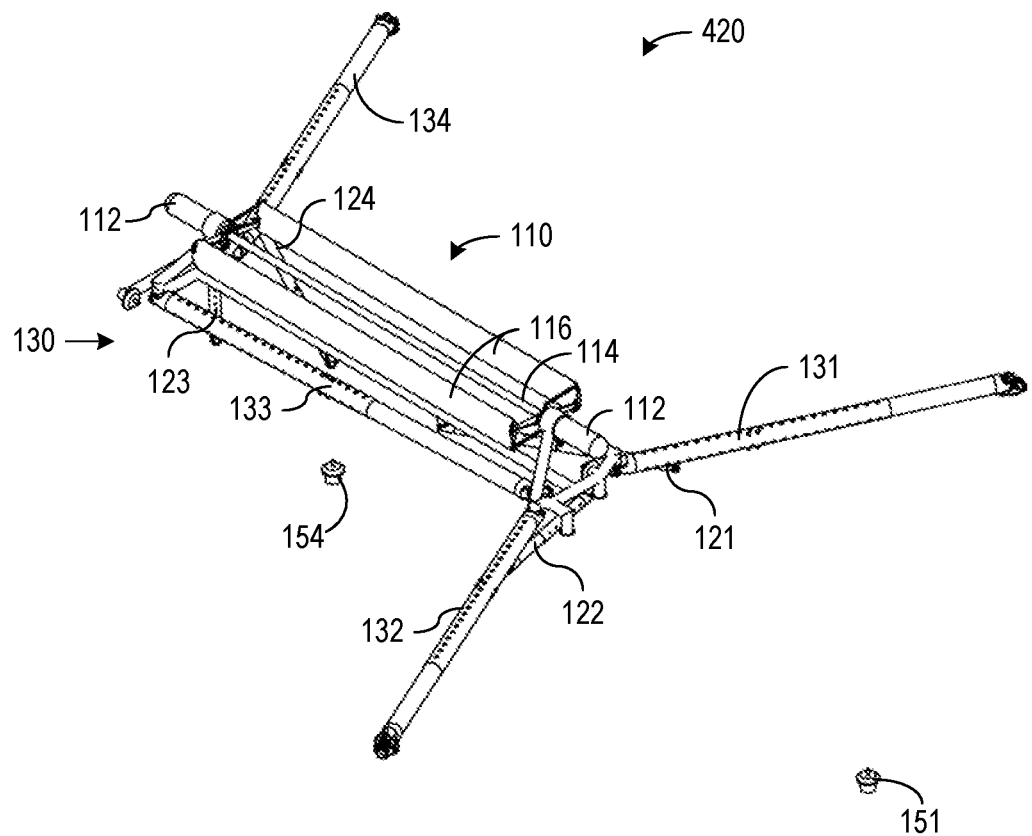
Figures 3, 4:
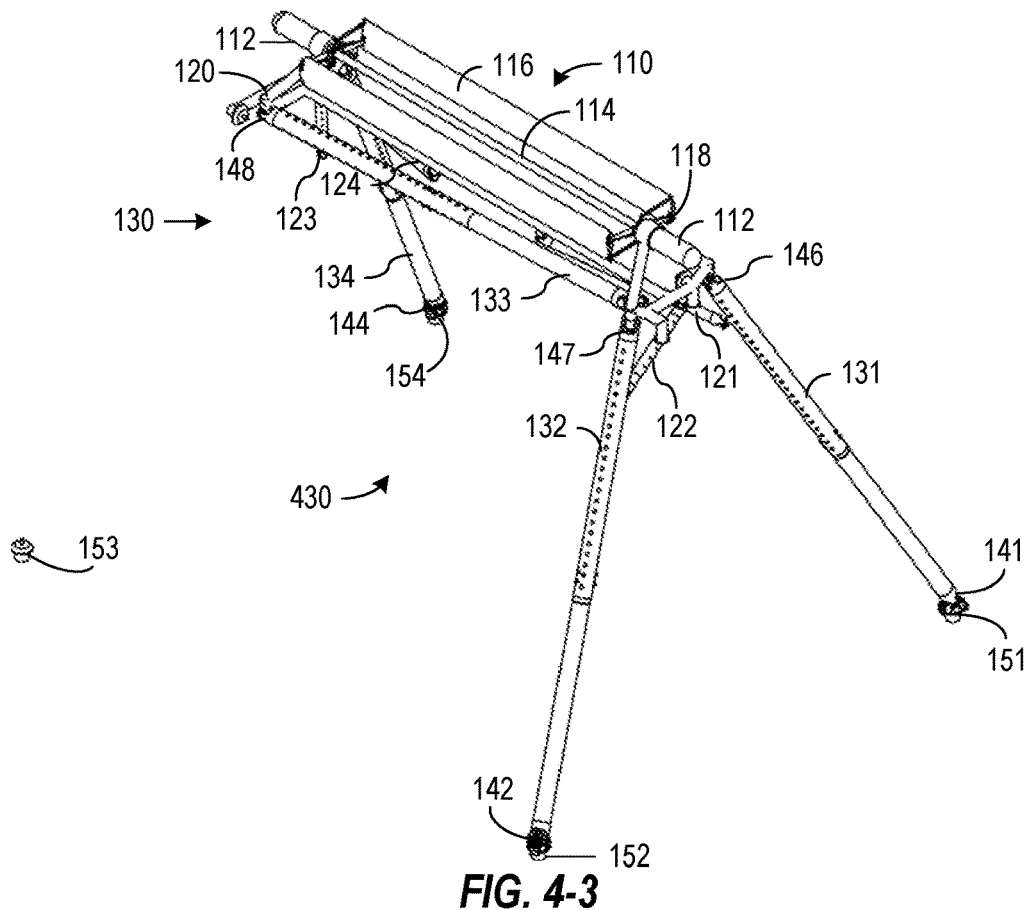

FIGS. 4-1, 4-2, and 4-3 show configurations of system 100 that may be used for installation, maintenance, decommissioning of system 100. FIG. 4-1 particularly shows a stowed leg configuration 410 of a mooring system 130 on which an OWEC 110 is mounted. Stowed leg configuration 410 may be used during commissioning and decommissioning an OWEC as well as storage and shipping of a complete OWEC system including both OWEC 110 and mooring system 130. FIG. 4-1 shows all four legs 131, 132, 133, and 134 disconnected from mooring points 151, 152, 153, and 154, rotated about joints 146, 147, 148, and 149 into a horizontal plane, and arranged along the long side of platform 120. The free ends (or bottoms) of legs 131, 132, 133, and 134 may respectively engage mating features 341, 342, 343, and 344 on platform 120 as shown in FIG. 3. Mating features 341, 342, 343, and 344 may have the same shape as mooring points 151, 152, 153, and 154 so that the same mooring latches on the ends of legs 131, 132, 133, and 134 may mate with and securely latch onto either mooring points 151, 152, 153, and 154 or mating features 341, 342, 343, and 344 of platform 120. For stowed configuration 410, legs 131, 132, 133, and 134 have lengths adjusted to fit in the stowed positions, and legs 131, 132, 133, and 134 and platform 120 may be sealed and fully or partly filled with air to provide flotation when positioning the system in the ocean. The buoyancy of the entire system may be controlled such that the buoyancy of legs 131, 132, 133, and 134 plus the buoyancy of platform 120 support wave OWEC 110 in a position clearly over the water, e.g., fully out of the water. Accordingly, the wave energy converter system in stowed configuration 410 cannot only be shipped or stored in the stowed configuration but can also be towed by means of tug boats during commissioning and decommissioning in the ocean. The stowed configuration 410 provides the system with hydrodynamic properties similar to a familiar pontoon boat, so that the system can be efficiently towed over large distances from a launch port to the deployment location. The ability of the OWEC system to float also eliminates the need for any offshore lifting activities or floating barges or platforms, thus greatly reducing the cost for installation and removal operations.

FIG. 4-2 illustrates an intermediate configuration 420 during which legs 131, 132, 133, and 134 may be unfolded from the stowed configuration during OWEC installation or folded toward the stowed configuration during removal of the OWEC system. For example, once mooring system 130 and OWEC 110 have reached an installation destination above mooring points 151, 152, 153, and 154, the connection of the mooring latches of legs 131, 132, 133, and 134 to platform 120 are released, so that legs 131, 132, 133, and 134 can then be unfolded either one at a time or all at once. FIG. 4-2 shows a configuration 420 in which three legs 131, 132, and 134 are unfolded and one leg 133 remains folded into its stowed position. The unfolding (or folding) may be externally actuated by attaching mooring lines between a tug boat and the end of a leg 131, 132, 133, or 134. However, the actuators may be provided inside braces 121, 122, 123, and 124 to support unfolding by pushing the legs 131, 132, 133, and 134 from stowed to extended positions.

An alternative method of deploying legs 131, 132, 133, and 134 may rely on the buoyancy of legs 131, 132, 133, and 134. For example, if each leg 131, 132, 133, or 134 is positively buoyant but submerged when platform 120 is positioned above mooring points 151, 152, 153, and 154, releasing the bottom end of the leg from latch points 341, 342, 343, or 344 on platform 120 will allow the end of the leg to float outward from platform 120 during deployment. If each leg 131, 132, 133, or 134 is negatively buoyant, the bottom end of the leg will sink downward when released from platform 120. In either case, attachment of the bottom ends of legs 131, 132, 133, and 134 to mooring points 151, 152, 153, and 154 may be completed in the same manner as when jacking systems in braces 121, 122, 123, and 124 are used to deploy legs 131, 132, 133, and 134, but use of buoyancy for leg deployment may avoid the need for jacking systems in one or more of braces 121, 122, 123, and 124.

The free ends of legs 131, 132, 133, and 134 can be attached to previously installed mooring points 151, 152, 153, and 154 located on the ocean floor or on a submerged platform. Mooring points 151, 152, 153, and 154 can be installed using a variety of customary offshore techniques like gravity foundations, driven piles, suction caissons, or drilled rock anchors. The technology of choice will typically be determined by local bathymetry of the ocean floor. As mentioned above, the mooring system 130 is very tolerant of inaccuracies in positioning of mooring points 151, 152, 153, and 154, both with regards to lateral and vertical location as well as the orientation of mooring points 151, 152, 153, and 154 because legs 131, 132, 133, and 134 are independently extensible and because of the rotation freedom of the latches or joints 141, 142, 143, and 144 at the bottoms of legs 131, 132, 133, and 134. In order to approximate the leg ends with the mooring points 151, 152, 153, and 154, mooring lines may be used to guide mooring latches on the leg ends into position to mate with mooring points 151, 152, 153, and 154. The outcome of this procedure is the attachment of the wave energy converter to the ocean floor by all four legs, as shown, for example, in FIG. 1-1.

FIG. 4-3 shows a configuration 430 in which three legs 131, 132, and 134 are attached to mooring points 151, 152, and 154 and the fourth leg is 133 in its stowed position. Three of the four legs with their respective braces are sufficient to stabilize all six degrees of freedom of platform 120. The configuration 430 may be reached, for example, during commissioning or decommissioning when leg 133 is the last leg to be attached to a mooring point 153 or the first leg to be detached from mooring point 153. Alternatively, if leg 133 or any associated structure of leg 133 requires maintenance or replacement, leg 133 may be detached from mooring point 153 and raised to its stowed location for maintenance. Legs 131, 132, and 134 at the same time may be extended as described further below to position leg 133 for more convenient maintenance, e.g., to lift stowed leg 133 out of the water.

Figures 1, 5:
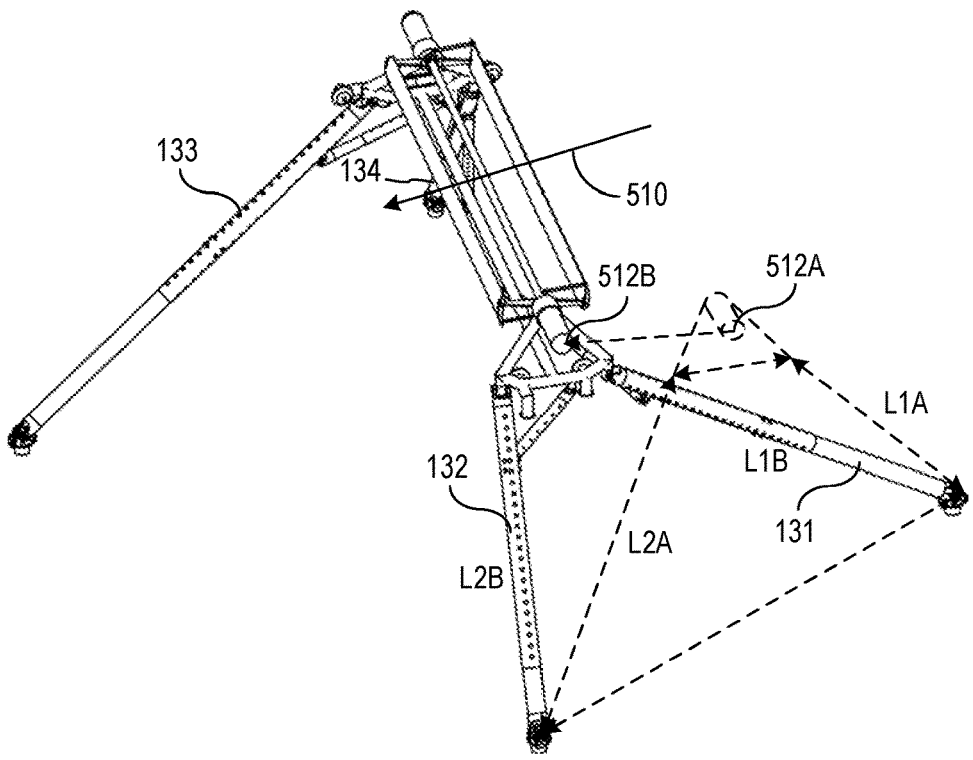
Figures 2, 5:
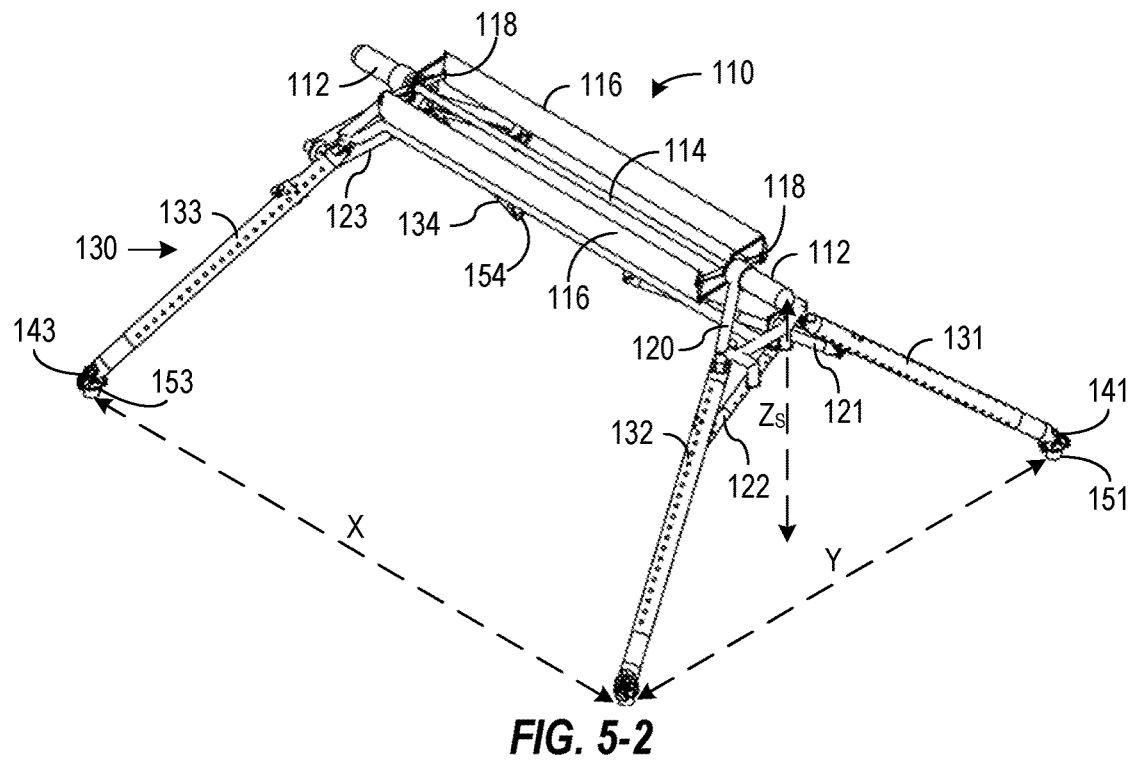
Figures 3, 5:
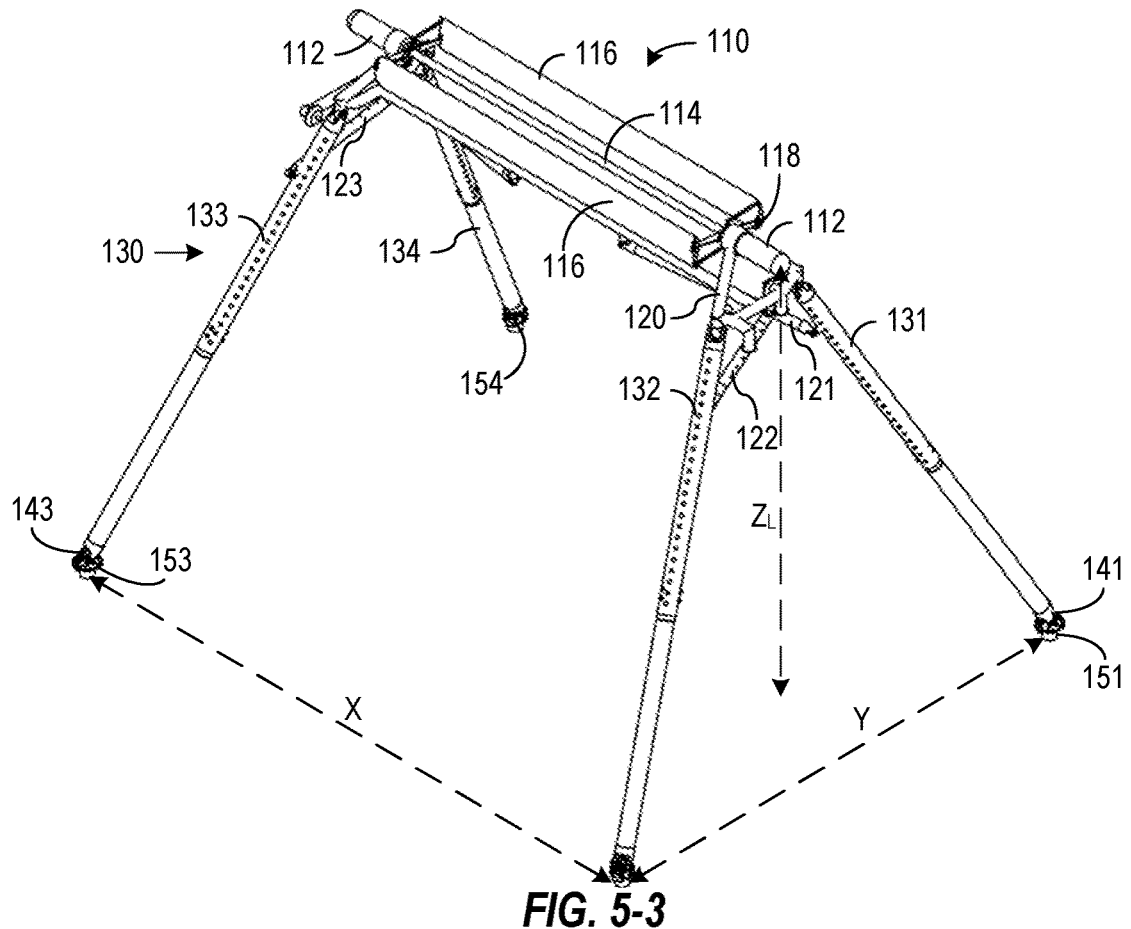

Mooring systems in accordance with examples of the present disclosure may further change configuration during operation of the OWEC, for example, for wave direction alignment, for OWEC depth control, or to place the OWEC in a safe configuration for storms or other ocean-surface events. FIG. 5-1 shows an example configuration of an OWEC system to alter the compass heading of an OWEC. OWECs, particularly CycWECs, may provide highest-efficiency wave energy conversion when the OWEC is aligned to the current wave direction. FIG. 5-1 particularly shows OWEC 110 in an operational state that aligns OWEC 110 with a direction 510 of the incoming waves to optimize the power conversion efficiency. This can be achieved by adjusting the lengths of the legs 131, 132, 133, and 134. FIG. 5-1 particular includes dashed lines representing lengths L1A and L2A of legs 131 and 132 that will position a generator 112 on the near end of platform 120 at a position 512A. If the length of leg 131 is extended from length L1A to a length L1B and the length of leg 132 is reduced from length L2A to a length L2B, generator 112 shifts laterally to a position 512B. Changes in the lengths of braces attached to legs 131 and 132 further accommodate or control the shift to position 512B. On the far end of platform 120, the length of leg 133 may be increased and the length of leg 134 may be decreased to shift the far end of platform in the opposite lateral direction. Altering the leg lengths in this manner can provide a range of left and right yaw motions that is sufficient to correct alignment of OWEC 110 with the wave direction for almost all of the possible sea states encountered during the operational life of OWEC 110. In an example configuration, a feedback controller (described further below) may be used to control the alignment and the yaw motion by operating actuators or jacking systems to alter the lengths of legs 131, 132, 133, and 134 and braces 121, 122, 123, and 124. In general, legs 131, 132, 133, and 134 may be adjusted individually in sequence or simultaneously in parallel to achieve a configuration providing a desired yaw of the OWEC.

Adjustment of the lengths of all four legs can be used to optimize the submergence depth, e.g., depth D of FIG. 1-4, for energy conversion efficiency, even in the presence of the sea-level changes caused by tidal activity. By optimizing submergence and orientation, the annual wave power extraction can be optimized.

Adjustment of the OWEC depth D may also be used for safety. FIG. 5-2, for example, illustrates a storm survival configuration in which the mooring system shortens legs 131, 132, 133, and 134 to lower OWEC 110 to a deeper depth, where OWEC will not be damaged by wave action. To avoid damage during extreme sea states, platform 120 can be submerged deeper during severe storms. A minimum vertical distance $Z_S$ may be achieved by shortening legs 131, 132, 133, and 134 as much as feasible or geometrically possible under the mechanical constraints, which moves platform 120 to the deepest possible position. The most important goal of increasing the submergence is to avoid surfacing of any part of the OWEC system, which would expose it to wind, slamming wave forces and green water impact due to breaking waves, which may cause damage to the structure. Since wave-induced water velocities exponentially decay with submergence depth, this operation can greatly reduce storm-induced loads and thus improve storm survivability of OWEC 110. Storm survival has been problematic for most of the prior or proposed OWEC systems.

FIG. 5-3 illustrates a maintenance configuration for an OWEC system. If legs 131, 132, 133, and 134 are extended to maximum lengths, wave energy converter 110, including platform 120, may be fully lifted above the ocean surface. In this position, as shown in FIG. 5-3, all of the important platform and wave energy converter systems and components may be accessible above water, and the stable platform 120 permits maintenance operations of all important systems and components, for both scheduled and unscheduled maintenance. The ability to move platform to the maintenance configuration may all but eliminate the need to tow OWEC 110 or mooring system 130 back to port for repairs, which is typically far more time consuming and thus costly compared to performing repairs at the deployment site. If any of the leg jacking mechanisms need maintenance or repair, each leg 131, 132, 133, or 134 in need of repair may be lifted one at a time, e.g., as shown in FIG. 4-3, while platform 120 is in the maintenance configuration as shown in FIG. 5-3. With a leg unloaded and securely attached to the side of platform 120, the leg, the leg jacking mechanism for the leg, the brace 121, 122, 123, or 124 attached to the leg, and their mechanical parts can be inspected and serviced as needed.

Figure 6:
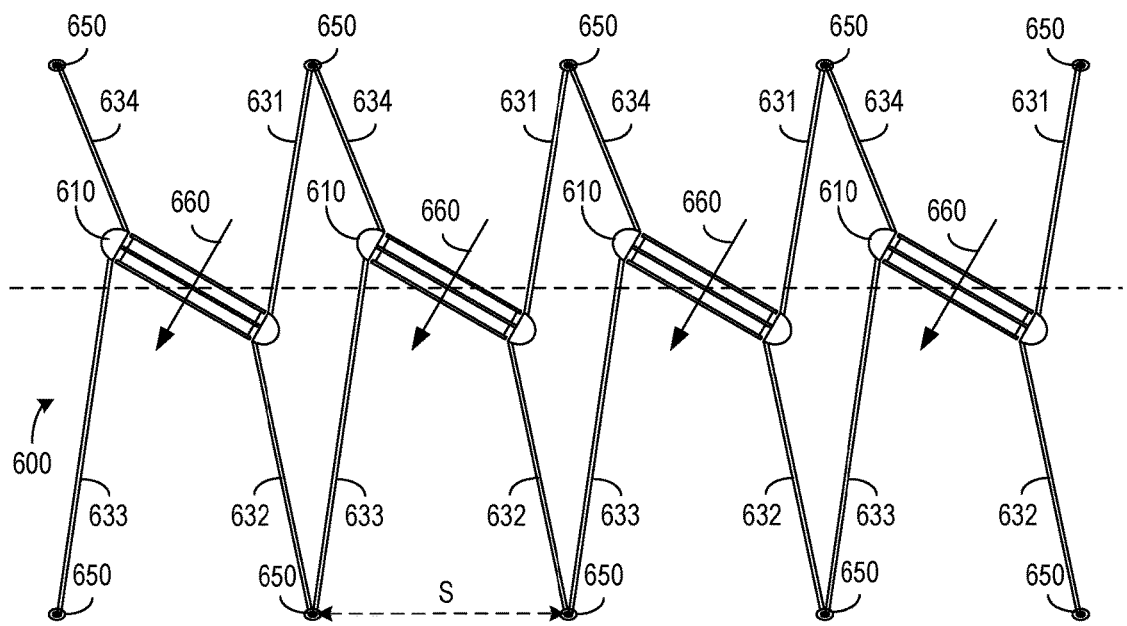
FIG. 6 shows a top view of a line cluster of moored CycWECs at a non-zero wave angle and having shared mooring points.

FIG. 6 shows a top view of a line 600 of four-legged OWEC systems that share at least some mooring points 650. In general, orienting legs 631, 632, 633, and 634 of each mooring system to line up with the loads that the OWEC 610 generates may best accommodate the loads and may be the most common orientation. In particular, legs 131, 132, 133, and 134 being perpendicular to the main shaft of OWEC 610 provides more direct opposition to reactive forces, with a mooring footprint that is as wide as the length of the platform or OWEC 610, and mooring points 650 may be ideally oriented along lines perpendicular to the prevailing wave direction at the installation site. In some installations, however, other factors such as secure anchoring of mooring points 650 on the ocean floor may dictate that a positioning of mooring points 650 that is not along the wave fronts of prevailing wave action, so that legs 631, 632, 633, and 634 are not be optimally oriented for the reactive loads but are still sufficient for the reactive loads. Also, while many installation locations, may have a prevailing direction for incoming waves, the waves may shift direction at different times of the day or year. FIG. 6 shows a configuration in which a current wave direction 660 is at a non-perpendicular angle to two rows of mooring points 650. In the configuration of FIG. 6, extending legs 631 and 633 relative to legs 632 and 634 orients OWECs 610 for optimal wave energy conversion, e.g., so that hydrofoils in each CycWEC have lengths perpendicular to the wave direction 660.

FIG. 6 also illustrates how choosing a footprint or separation S between mooring points 650 that is wider than the length of the platform or OWEC 610 has the advantage that in an installation with multiple wave energy converters in a line, the neighboring converters 610 can share mooring points 650 while still being optimally oriented and exposed to the incoming waves without being in the wake of a neighboring converter 610. Sharing mooring points 650 can greatly reduce the installation cost by decreasing the overall number of mooring points required, and will likely outweigh the minor structural disadvantage experienced by the legs due to their angle with respect to the main shaft.

Figure 7:
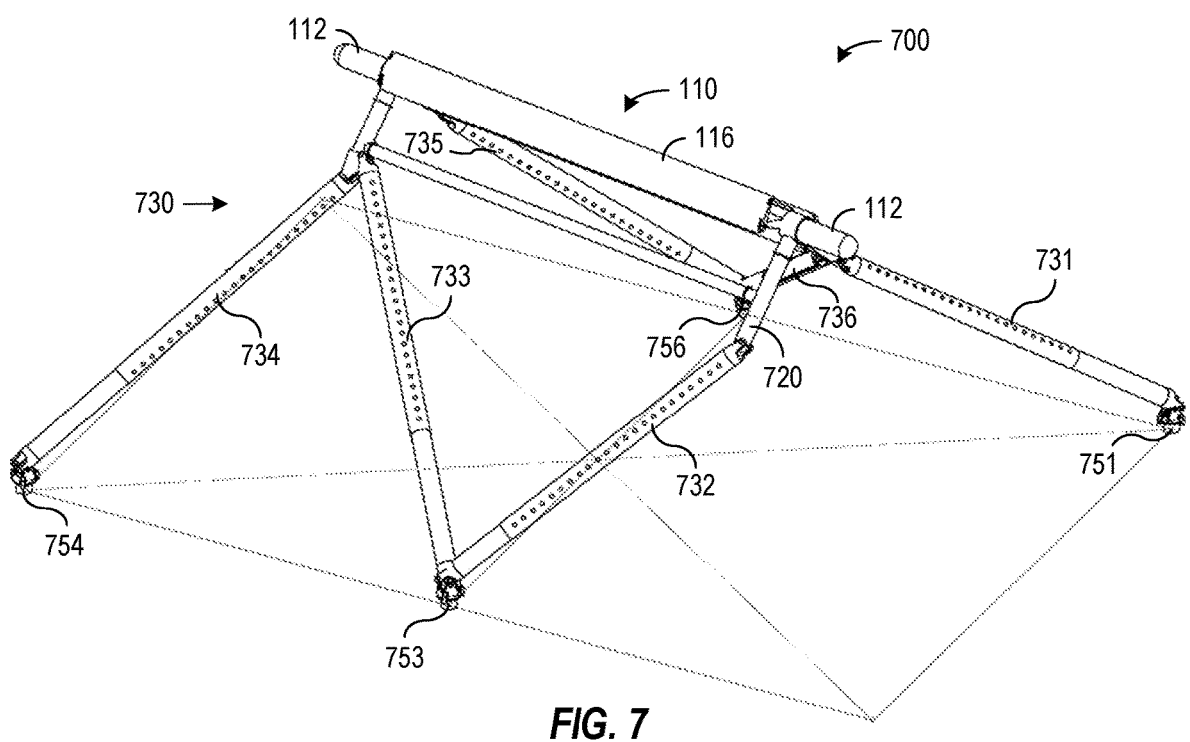
FIG. 7 shows a perspective view of a six-legged mooring system in accordance with an example of the present disclosure.

FIG. 7 shows an OWEC system 700 in accordance with another example of the present disclosure. In OWEC system 700, a CycWEC 110 is mounted on a platform 720 of a mooring system 730 having six extensible legs 731, 732, 733, 734, 735, and 736. Legs 731, 732, 733, 734, 735, and 736 are extensible to independently change lengths as needed to define a configuration of mooring system 730, and each leg 731, 732, 733, 734, 735, or 736 may contain a jacking or actuation system such as system 200 described above with reference to FIG. 2. Legs 731 and 736 have top ends connected near a first corner of platform 720 using joints, e.g., Cardan joints, that allow independent rotations of legs 731 and 736 about two axes. Leg 732 has a top end connected near a second corner of platform 720 using a joint, e.g., a Cardan joint, that allows independent rotation of leg 732 about two axes. Legs 733 and 734 have top ends connected near a third corner of platform 720 using joints, e.g., Cardan joints, that allow independent rotations of legs 733 and 734 about two axes. Leg 735 has a top end connected near a fourth corner of platform 720 using a joint, e.g., a Cardan joint, that allows independent rotation of leg 735 about two axes. Other joints, e.g., further Cardan joints, or mooring latches connect the bottom end of leg 731 to a mooring point 751, the bottom ends of legs 732 and 733 both to a mooring point 753, the bottom end of leg 734 to a mooring point 754, and the bottom ends of legs 735 and 736 both to a mooring point 756. The four mooring points 751, 753, 754, and 756 may be attached to the ocean floor and nominally arranged at the vertices of a parallelogram, but the ability of legs 731, 732, 733, 734, 735, and 736 to change lengths and the rotational freedom of joints attaching legs 731, 732, 733, 734, 735, and 736 to mooring points 751, 753, 754, and 756 allows mooring system 730 to adapt significant variation in the positioning of mooring points 751, 753, 754, and 756.

Even though each of the joints connecting legs 761, 762, 763, 764, 765, and 766 to platform 720 and mooring points 751, 753, 754, and 756 allow two degrees of freedom of rotations, fixing the lengths of legs 761, 762, 763, 764, 765, and 766 provides a stable/rigid configuration of mooring system 730. In comparison to OWEC system 100 described above, mooring system 730 employs six extensible structural members 761, 762, 763, 764, 765, and 766, while mooring system 130 employed eight extensible structural members 131, 132, 133, 134, 121, 122, 123, and 124. The pairing of legs, e.g., legs 732 and 733 or 735 and 736, attached to the same mooring point, e.g., mooring point 753 or 756, is structurally similar to a leg and a brace. In the illustrated configuration, each pair of legs 732 and 733 or 735 and 736 converges laterally toward mooring point 753 or 756, providing lateral bracing. The converging of each leg 761, 762, 763, 764, 765, and 766 from the wider separations of mooring points 751, 753, 754, and 756 toward more narrowly space connections on platform 720 provides torque bracing. Although the geometry of mooring system 730 differs from the geometry of mooring system 130, proportional changes in the lengths of legs 761, 762, 763, 764, 765, and 766 may change the elevation of CycWEC 110 from an above water position to a range of operational depths for wave energy conversion to a deep submersion for storm safety in a manner similar to described above with reference to FIGS. 5-2 and 5-3. Additionally, increasing or decreasing the lengths of legs 731 and 736 and/or legs 733 and 734 (while correspondingly decreasing or increasing the lengths of legs 732 and/or 735) may yaw CycWEC 110 right or left, e.g., to position CycWEC 110 according to a wave direction.

Figure 8:
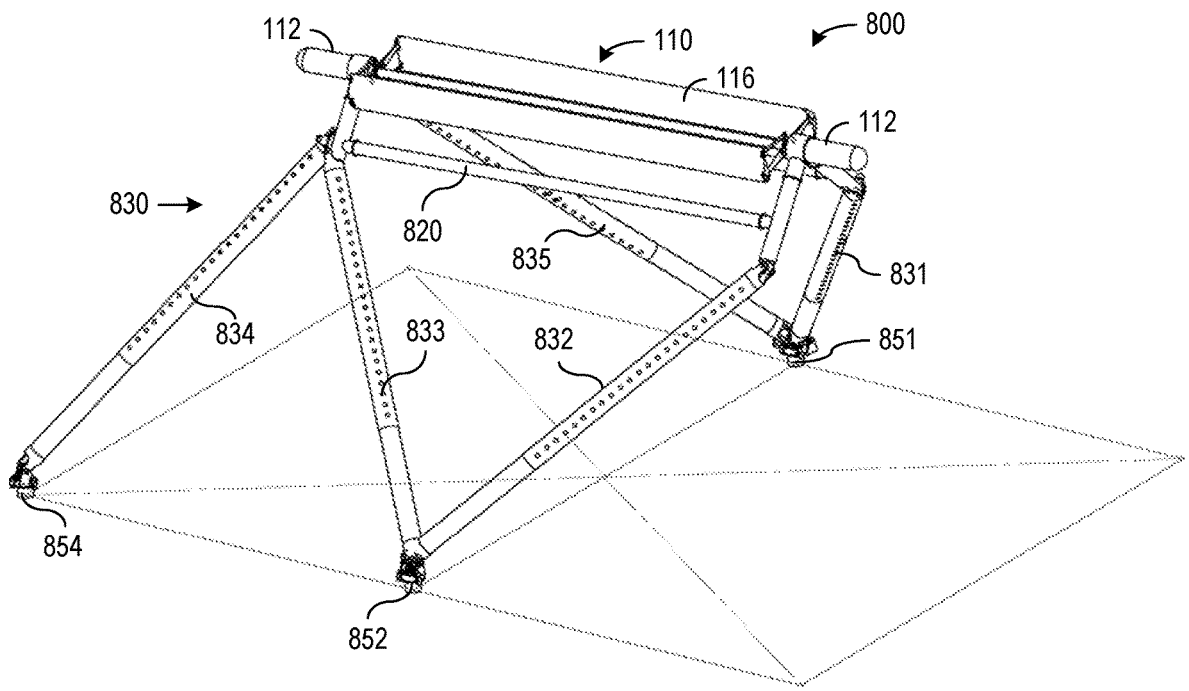
FIG. 8 shows a perspective view of a five-legged mooring system in accordance with an example of the present disclosure.

FIG. 8 shows a OWEC system 800 in accordance with an example of the present disclosure in which an OWEC 110 is mounted on a platform 820 of a mooring system 830 having five extensible legs 831, 832, 833, 834, and 835. Legs 831, 832, 833, 834, and 835 are extensible to independently change lengths as needed to define a configuration of mooring system 830, and each leg 831, 832, 833, 834, or 835 may contain a jacking or actuation system such as system 200 described above with reference to FIG. 2. Legs 831 and 832 have top ends connected near a first and second corners at one end of platform 820. Legs 833 and 834 have top ends connected near a third corner at an opposite end of platform 820. Leg 735 has a top end connected near a fourth corner at the opposite end of platform 720. The top ends of legs 831, 832, 833, 834, and 835 are connected to platform 820 using joints, e.g., Cardan joints, each of which supports compress and tension but allows independent rotation of the attached leg about one or two axes. Other similar joints, e.g., further Cardan joints or latches, connect the bottom end of legs 831 and 835 to a mooring point 851, the bottom ends of legs 832 and 833 both to a mooring point 852, and the bottom end of leg 834 to a mooring point 854. The three mooring points 851, 852, and 854 may be nominally arranged at the vertices of a horizontal triangle, but the ability of legs 831, 832, 833, 834, and 835 to change lengths allows mooring system 830 to adapt to significant variations in the positioning of mounting points 851, 852, and 854.

OWEC system 800 differs from OWEC system 100 and 700 in that OWEC system 800 only needs three mooring points 851, 852, and 854 for anchoring of OWEC 110. In contrast, OWEC systems 100 and 700 each use four mooring points. Additionally, in one variation of OWEC system 800, instead of extensible structural members 833 and 835 connecting to mooring points 852 and 851, the bottoms of structural members 833 and 835 may instead be respectively connect to legs 832 and 831 as extensible braces, making mooring system 830 a three-legged mooring system. Mooring system 830 has only five extensible structural elements 831, 832, 833, 834, and 835, and fixing and holding the lengths of structural elements 831, 832, 833, 834, and 835 constrains only five degrees of freedom of motion of OWEC 110 if all of the joints connecting structural members 831, 832, 833, 834, and 835 to platform 820 and mooring points 851, 852, and 854 provide two degrees of freedom to swing the element about the joint. To restrict all six degrees of freedom of platform 820, some of the joints are not Cardan joints with two degrees of swing rotation allowed but have only one degree of rotation, e.g., one or more of the joints may be a hinge or pivot structure. The configuration of mooring system 830 or OWEC system 800 may, however, be changed, for example, by expanding or contracting the lengths of structural elements 831, 832, 833, 834, and 835 to raise or lower OWEC 110. The orientation or compass heading of OWEC 110 may be changed by extending or shortening the lengths or structural elements connected to diagonally opposing corners of platform 820.

Figure 9:
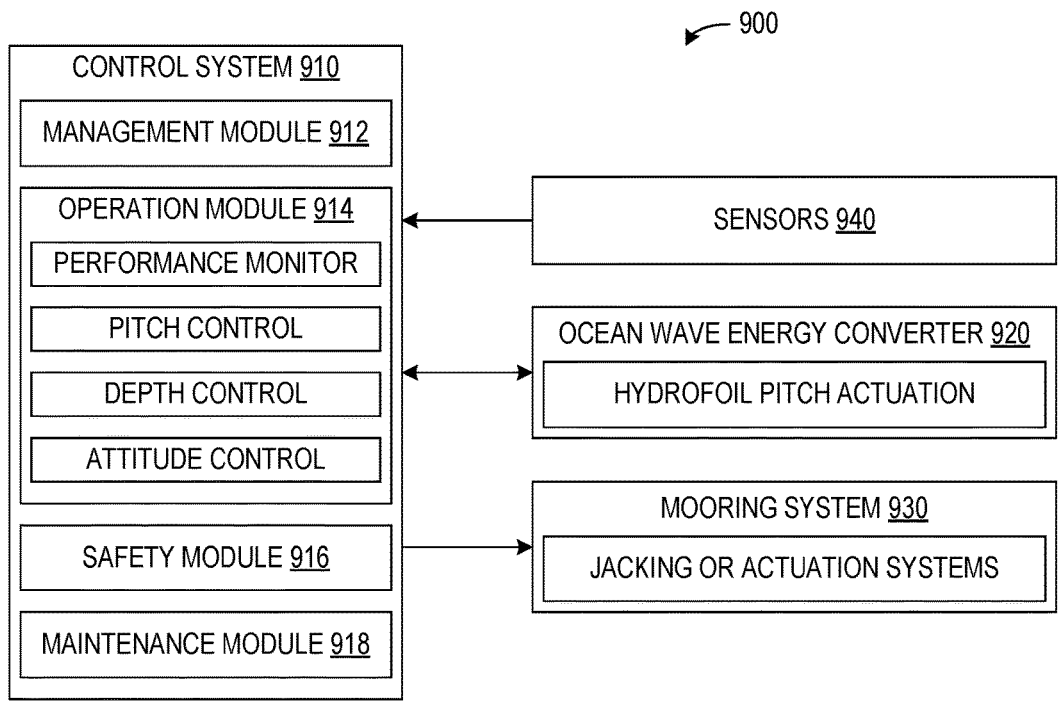
FIG. 9 is a block diagram illustrating a control system for a wave energy converter and mooring system in accordance with an example of the present invention.

FIG. 9 is a block diagram of a OWEC system 900 including a control system 910 for an OWEC 920 on a mooring system 930 that is installed in the ocean to convert wave energy to electrical energy. Control system 910 may include a computer that is either at the installation location or remote from wave energy converter installation. Control system 910 generally receives sensor signals from sensors 940 and generates control signals that control the operation of OWEC 920 and mooring system 930. Sensors 940 may generally measure weather and ocean conditions and the performance and operating parameters of OWEC 920 or mooring system 930. For example, sensors 920 may measure current amplitudes and propagation direction of incoming waves at the installation site, conversion efficiency indicated by amplitudes of waves after passing by OWEC 920, the orientation, depth, and rotational frequency of OWEC 920, and the power output of OWEC 920.

In the illustrated configuration, control system 910 includes a management module 912, an operation module 914, a safety module 916, and a maintenance module 918. Management module 912 may be configured to provide a user interface that allows a human manager to monitor and manage the operation of OWEC 920 and the energy that OWEC 920 produces. Operation module 914 may be configured to automatically control operation of OWEC 920 and mooring system 930. In particular, operation module 914 may monitor the operating parameters and performance of OWEC 920, which may be measured by sensors 940, and based on the sensor input control or actuate a pitch or pitching cycle of hydrofoils in OWEC 920, control jacking or actuation systems of mooring system 930 to provide OWEC 920 with a depth and orientation that optimizes power conversion efficiency for the current ocean conditions. Safety module 916 may be configured operate mooring system 930 to lower OWEC 920 to a sufficiently deep depth to withstand storms or exceptionally high seas. Maintenance module 918 may be configure to raise OWEC 920 or mooring system 930 into a configuration suitable for maintenance or repair procedures.

Each of modules disclosed herein may include, for example, hardware devices including electronic circuitry for implementing the functionality described herein. In addition or as an alternative, each module may be partly or fully implemented by a processor executing instructions encoded on a machine-readable storage medium, e.g., a non-transient media, such as an optical or magnetic disk, a memory card, or other solid state storage containing instructions that a computing device can execute to perform specific processes that are described herein.

Although particular implementations have been disclosed, these implementations are only examples and should not be taken as limitations. Various adaptations and combinations of features of the implementations disclosed are within the scope of the following claims.

What is claimed is:

1. A method for using a mooring system for a wave energy converter, the method comprising:
   mounting the wave energy converter on a platform of the mooring system;
   positioning a plurality of legs of the mooring system in a stowed configuration, the stowed configuration having the legs positioned so that the legs extend along a length of the platform and attach to the platform at joints that provide two degrees of freedom for rotations of the legs about the respective joints;
   moving the mooring system with the legs in the stowed configuration through water to an installation location, the legs and the platform together providing floatation during the moving of the mooring system;
   operating a jacking system to extend one or more braces connected to the legs, thereby rotating the legs from the stowed configuration;
   operating the jacking system to extend lengths of the legs for attachment of the legs to moorings at the installation location; and
   operating the jacking system to control an operating configuration of the wave energy converter by altering the lengths of the legs after the legs are attached to the moorings.

2. The method of claim 1, wherein operating the jacking system to control the operating configuration comprises changing the lengths of the legs to position the wave energy converter to an operating depth below a surface of the water suitable for storm survival.

3. The method of claim 2, wherein operating the jacking system to control the operating configuration comprises extending the lengths of the legs to lift the wave energy converter from of the water for maintenance.

4. The method of claim 1, wherein operating the jacking system to control the operating configuration comprises changing the lengths of the legs to change orientation of the wave energy converter and align the wave energy converter with a wave direction.

* * * * *